United States Patent [19]

Hunt

[11] Patent Number: 5,193,954
[45] Date of Patent: Mar. 16, 1993

[54] UNIVERSAL TOOL CONNECTION

[75] Inventor: Carl E. Hunt, White Lake, Mich.

[73] Assignee: GTE Valenite Corporation, Troy, Mich.

[21] Appl. No.: 784,845

[22] Filed: Oct. 30, 1991

[51] Int. Cl.⁵ .......................... B23C 5/26; B23B 31/02
[52] U.S. Cl. ........................... 409/233; 82/160; 408/239 R; 409/234
[58] Field of Search ............. 469/231, 232, 233, 234; 408/238, 239 R; 82/160

[56] References Cited

U.S. PATENT DOCUMENTS

| | | | |
|---|---|---|---|
| 4,715,753 | 12/1987 | Tack | 409/234 |
| 4,745,673 | 5/1988 | Araki et al. | 409/233 |
| 4,758,122 | 7/1988 | Kubo | 409/233 |
| 4,784,542 | 11/1988 | Talk et al. | 409/234 |
| 4,804,301 | 2/1989 | Hunt | 409/233 |
| 4,836,068 | 6/1989 | Erickson | 409/233 X |
| 4,844,671 | 7/1989 | Reinauer | 409/233 |
| 4,863,323 | 9/1989 | Glaser | 409/232 |
| 4,951,578 | 8/1990 | Von Haas et al. | 409/232 |
| 4,978,262 | 12/1990 | Tjernström | 409/233 |

FOREIGN PATENT DOCUMENTS 2606206  1/1977  Fed. Rep. of Germany ...... 409/233

Primary Examiner—William Briggs
Attorney, Agent, or Firm—Bill C. Panagos

[57] ABSTRACT

A mechanism for clamping a cutting tool holder in a socket formed in an end face of a clamping unit in a cutting machine. An axially movable drawbar has a multiple number of flat surfaces obliquely angled to the drawbar axis for exerting cam forces on individual wedge elements that are slidably guided for outward movement into wedge lock engagements with an in-turned flange on the tool holder. The wedge elements exert axial forces on the tool holder internal flange for simultaneously achieving a relatively tight fit of the tool holder in the associated socket and a seating of the tool holder against an end face of the clamping unit. The mechanism can be used in rotary or non-rotary machines.

20 Claims, 4 Drawing Sheets

5,193,954

UNIVERSAL TOOL CONNECTION

BACKGROUND OF THE INVENTION

1. Field of the Invention

This invention relates to mechanisms for clamping a cutting tool holder in a rotary machining center or a non-rotating turning center. The cutting tool can take a variety of different forms, e.g. a turning tool, threading tool, grooving tool, drill, boring tool, tap, reamer, end mill, face mill, spot facer, counterbore or countersink. The cutting machine can include a tool storage mechanism and a tool changer device for transferring a selected tool between the storage mechanism and the cutting machine. The invention is intended for use in non-rotating turning centers and/or rotating machining centers, whereby common tools can be shared or used o both types of machines.

2. Prior Developments

It is already known to equip rotary machining centers with clamping mechanisms for clamping selected cutting tool holders in a machine. Commonly the clamping mechanism comprises a circular socket formed in an end face of the spindle, and a drawbar movable linearly within the spindle on the socket axis of a machining center. The associated tool holder has a tubular section adapted for insertion into the socket for locking engagements with clamp elements carried by a movable drawbar.

SUMMARY OF THE INVENTION

The present invention relates to a clamping mechanism of the above-mentioned type, wherein the clamp elements are small light weight wedge elements that can be moved with a relatively small force input from the drawbar. The wedge elements are positively guided for movement between retracted and extended positions. A spring return means may be provided for positively returning the wedge elements to their retracted positions.

In one form of the invention the wedge elements take the form of rectangular cross-sectioned wedge elements slidably mounted in similarly cross sectioned guide passages formed in an annular guide member surrounding the drawbar. The drawbar has a tapered section having a frustum-like profile. Flat side surfaces on the tapered section of the drawbar mate with flat end surfaces on the wedge elements, whereby axial motion of the drawbar cams the wedge elements outwardly in the guide passages. The outer end surfaces of the wedge elements have angulated surfaces that mate with an annular internal angular flange surface on the associated tool holder, whereby the wedge elements are enabled to exert a wedge locking action on the tool holder flange As the wedge elements move outwardly their angulated end surfaces cam against the internal flange surface on the tool holder to produce a wedge locking action.

In preferred practice of the invention there is a multiplication of forces between the drawbar actuator and the tool holder, such that the tool holder is firmly locked in the socket. Force multiplication can be achieved by using a threaded coupling between the actuator and the drawbar, and by using small wedge angles on the drawbar and on the wedge elements.

THE DRAWINGS

FIG. 3 is a sectional view taken on line 3—3 in FIG. 2.

DESCRIPTION OF A PREFERRED EMBODIMENT OF THE INVENTION

Figure 1:
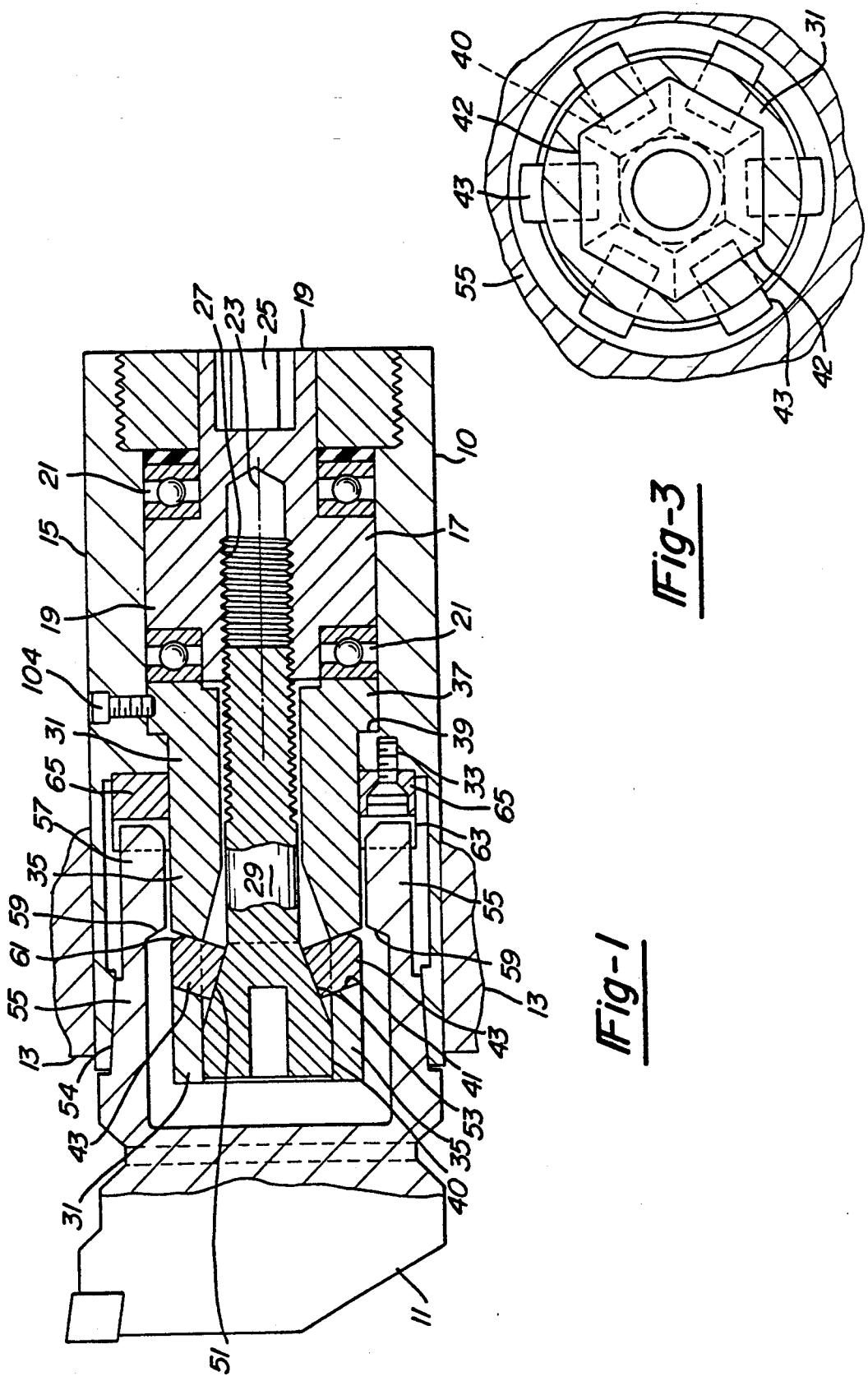
FIG. 1 is a sectional view taken through a clamping mechanism embodying the invention.

FIG. 1 shows a tool holder clamping mechanism for releasably mounting a tool holder 11 on a cutting machine. The cutting machine can be a numerically controlled machine equipped with a tool changer device for transferring tool holder 11 between a stored position in a storage magazine and an operating position inserted into a clamping unit that forms part of the machine. In the drawings the tool holder is shown in an inserted position in the clamping unit. The clamping unit is designated generally by numeral 10.

The turret of the machine is fragmentarily shown at 13. Suitably mounted on the turret is a clamping unit housing 15 having an internal cylindrical radial bearing surface 17 for a rotary actuator 19. Thrust bearings 21 are provided to facilitate smooth rotary movement of the actuator around a central axis 23. The actuator has a non-circular socket opening 25 adapted to receive a non-illustrated drive shaft associated with a servo motor mounted on the cutting machine. Alternately the actuator can be operated manually.

Actuator 19 has a threaded connection 27 with a slidable drawbar 29 that is slidably guided by an annular guide member 3 fixed within housing 15 by a location pin 104. Guide member 31 preferably has a loose fit in the housing to allow a floating effect that compensates for machining variations in other components.

Guide member 31 comprises an axially elongated annular section 35 surrounding the drawbar and an outwardly radiating flange 37 seated against an internal radial surface 39 of housing 15. The extreme left end of guide member 31 forms an internal guide surface having a hexagonal profile, as viewed in FIG. 3; six flat guide faces 40 have slidable engagement with six flat faces 42 on the left end section of drawbar 29, whereby the drawbar is confined to linear axial motion along central axis 23. Actuator 19 provides the motive force for the drawbar movement.

Guide member 31 has six guide passageways 44 extending obliquely transversely therethrough for slidably guiding wedge elements 43; each wedge element can be a bar or rod having a circular or non-circular cross section. Each passageway and associated wedge element has the same (e.g. rectangular) cross-section, whereby each wedge element is confined to linear motion toward or away from central axis 23, as denoted by arrow 45 in FIG. 2.

Figure 4:
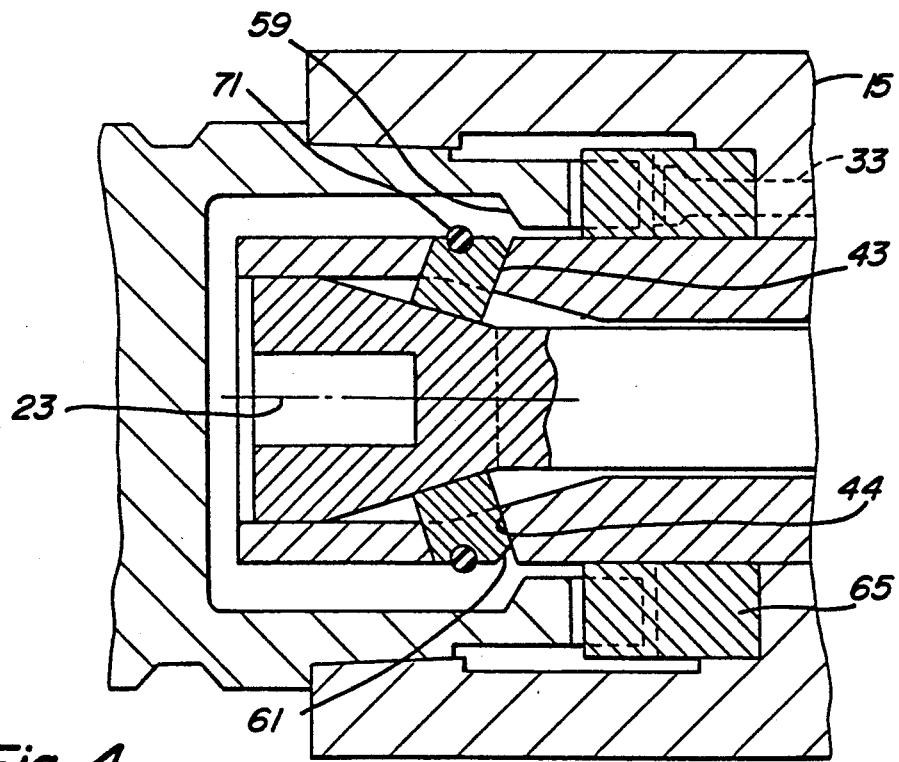
FIG. 4 is a view taken in the same direction as FIG. 2, but illustrating another embodiment of the invention.

Each wedge element 43 has a flat end face 51 that seats against a flat side surface 53 formed on a tapered section of drawbar 27. Flat surfaces 53 are continuations of the flat surfaces 42; each flat surface 53 has a trapezoidial shape. Rightward motion of the drawbar causes the six wedge elements to be moved outwardly away from central axis 23 to the positions shown generally in FIG. 2; although six wedge elements are shown, a different number of wedge elements can be used if so desired. Leftward motion of the drawbar enables the wedge elements to return inwardly to their FIG. 1 positions. Inward motion of the wedge elements can be achieved through the use of a spring return means, as shown in FIG. 4. Alternately the wedge elements can be returned inwardly by cam follower engagement with flange 57 of tool holder 11.

Figure 2:
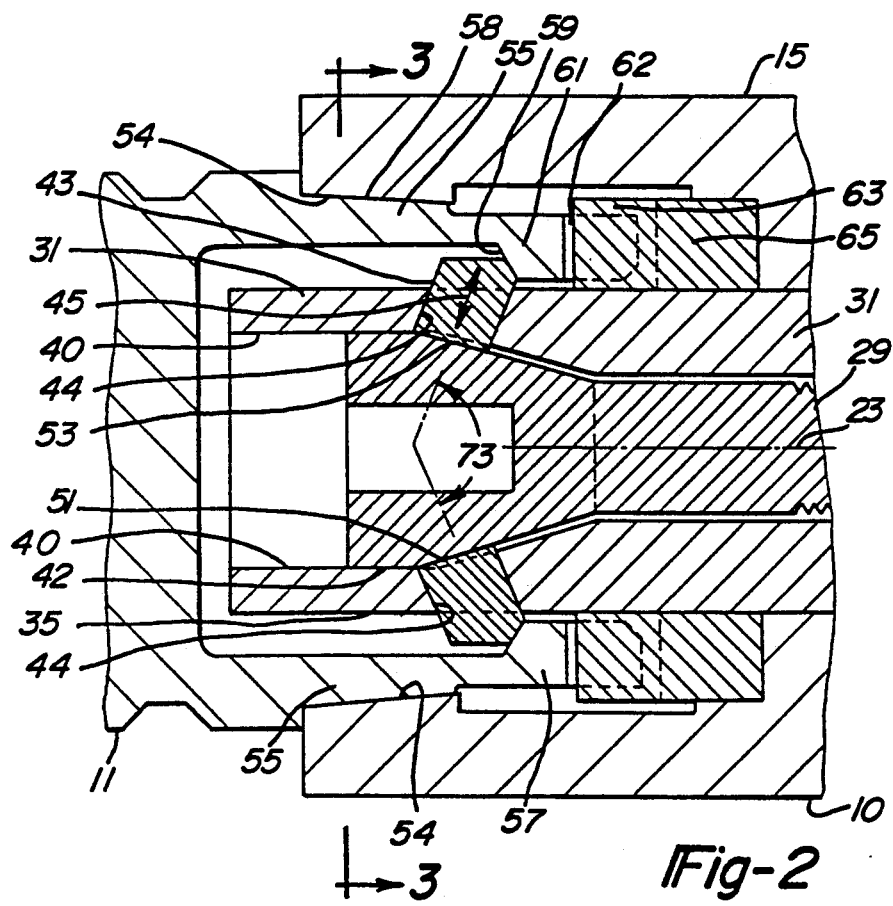
FIG. 2 is a fragmentary enlarged sectional view taken in the same direction as FIG. 1, but with the clamping elements in different positions of engagement.

Housing 15 has an annular slightly tapered frusto-conical surface 54 centered on central axis 23 to form a circular convergent socket for receiving the tubular section 55 of tool holder 11 FIG. 1 shows the tool holder loosely inserted into the socket, with the outer surface of tubular section 55 loosely engaged against socket surface 54. FIG. 2 shows the tool holder in a clamped condition, wherein the outer side surface 58 of tubular section 55 has a pressurized frictional wedge fit against socket surface 54. An axial tool holder surface 60 abuts against the end face of clamping unit 10 (i.e., housing 15).

The terminal end portion of tubular section 55 has an inturned flange 57 that defines an internal annular conical surface 59. The outer end surface of each wedge element 43 has a conical cam surface 61 having the same angulation as conical surface 59 (when the tool holder is inserted into socket 54). As the wedge elements 43 are moved outwardly by drawbar 29 cam surfaces 61 act as wedges to impart a rightward force to flange 57. As a result, the outer surface of tool holder section 55 has a tight pressurized fit against socket surface 54. The tool is thus tightly clamped to the machine so that the cutting tool does not wobble or deflect in response to the cutting loads. Wedge elements 43 constitute clamp elements for exerting wedge lock engagements on the tool holder flange 57.

The extreme right end of tool holder section 55 is formed with plural slots 62 that fit onto projections 63 formed on an annular drive key member 65 suitably bolted to housing 15 (as by bolts 33). Projections 63 transmit the rotary drive force from the clamping unit to the cutting tool. Annular key member 65 could be formed as an integral part of housing 15. However, by forming the key member as a separate bolt-on component the machining operations necessary for formation of the housing are greatly facilitated.

Projections 63 may be equidistantly spaced so as to be symmetrical around central axis 23. However, in an alternate arrangement the projections can be non-symmetrical (or of different circumferential length) so that tool holder 11 is required to have a particular orientation to achieve the desired interlock between slots 62 and projections 63. The tool holder can only fit into the clamping unit when the tool is in a proper position relative to the work.

The threaded holes in housing 15 for receiving bolts 33 are preferably symmetrical, i.e., evenly spaced, whereby annular drive key member 65 is enabled to be secured to housing 11 in various different adjusted positions (permitting tool holder 11 to face in different directions). For example, the tool holder 11 of FIG. 1 can be oriented to face upwardly, as shown in FIG. 1, or it can be oriented to face downwardly for upside down machining (or in some other direction), using the same drive key member 65 (having the non-symmetrical projections 63). Adjustment of the drive key member requires removal of bolts 33, rotational movement of the drive key member to a new position, and reinsertion of bolts 33.

The cutting tool may be unclamped from housing 15 by rotating actuator 19 so that drawbar 29 moves in a right-to-left direction (to the FIG. 1 position). A spring-urged plunger means (not shown) may be provided on the left end of the drawbar to loosen or partially eject the tool holder from socket 54.

FIGS. 1 through 3 illustrate one particular form of the invention. The remaining Figs. illustrate structural variations of the FIG. 1 structure.

FIG. 4 illustrates a spring structure for biasing clamp (wedge) elements 43 toward central axis 23. A resilient annular band 71 encircles the clamp elements and the outer side surface of guide member 31. Aligned grooves are formed on the clamp element outer end face and the guide member side surface for retaining band 71 in position to bias the clamp elements to their retracted positions. Resilient band 71 can be a toroidal wire garter spring or an elastomeric rubber element (e.g. an O-ring).

In the arrangements of FIGS. 1 through 4, the clamp elements are constrained at a slight acute angle to a radial plane taken normal to central axis 23. Thus, guide passageways 44 are oriented with their respective axes located in an imaginary conical pattern having a cone angle 73 measuring approximately one hundred forty degrees; the wedge elements 43 are thus bodily movable toward the conical wedge surface 59 to facilitate increased clamping pressure. Wedge surfaces 61 on the clamp elements move obliquely toward wedge surface 59 so as to have a relatively great wedge action on the tool holder, even though the wedge angle is relatively slight for a tight fit.

Figure 5:
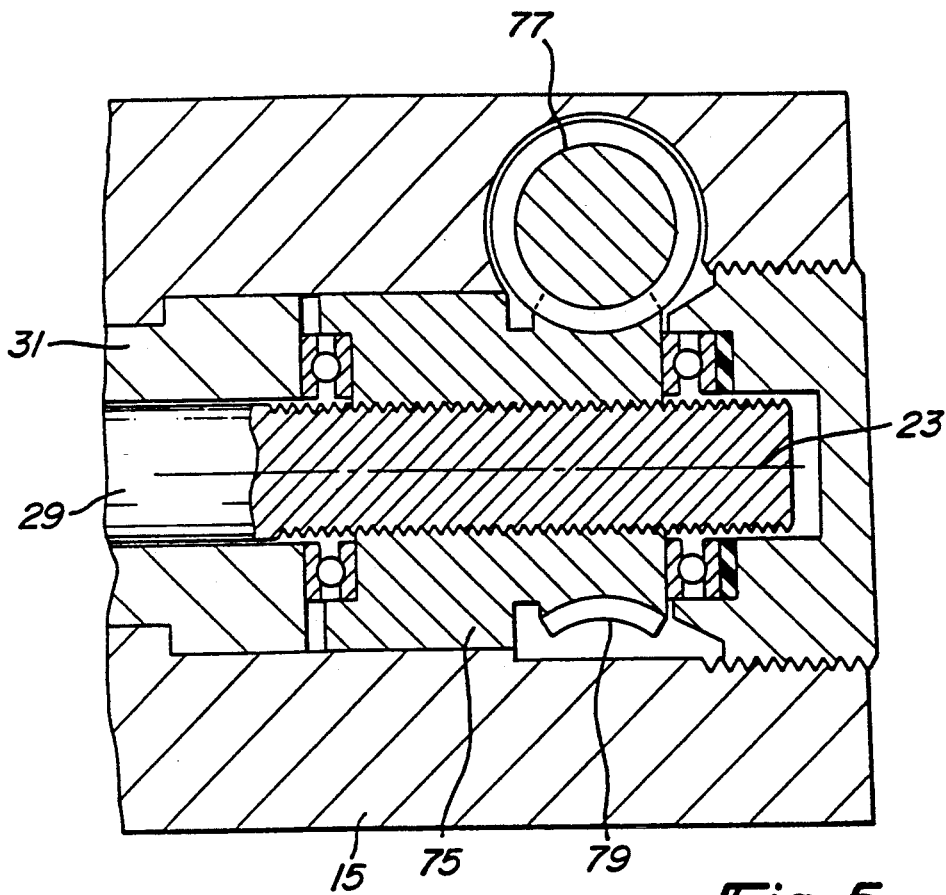
FIG. 5 is a fragmentary sectional view taken through a drawbar actuating device that can be used with any of the clamping mechanisms shown in FIGS. 1 through 4.

FIG. 5 illustrates a drawbar actuator that can be used in place of the actuator shown in FIG. 1. As shown in FIG. 5, the actuator mechanism comprises an annular internally threaded drive member 75 rotatably supported in housing 15 for rotation around central axis 23. A transversely extending worm 77 is supported in the housing, with the teeth thereof in meshed engagement with worm gear teeth 79 formed on the periphery of member 75. Motor actuation of worm 77 serves to rotate member 75; member 75 in turn produces a linear motion of the drawbar.

Various other mechanisms can be used to actuate the drawbar, e.g. a rack and pinion system or a transverse rotary cam, or a hydraulic piston However, the use of a worm gear actuator, as shown in FIG. 5, is beneficial in that the large mechanical advantage of the worm gear enables it to have a self-locking characteristic. Axial forces imposed by the drawbar on member 75 are ineffective to rotate worm 77 in the unlocking direction.

Figure 6:
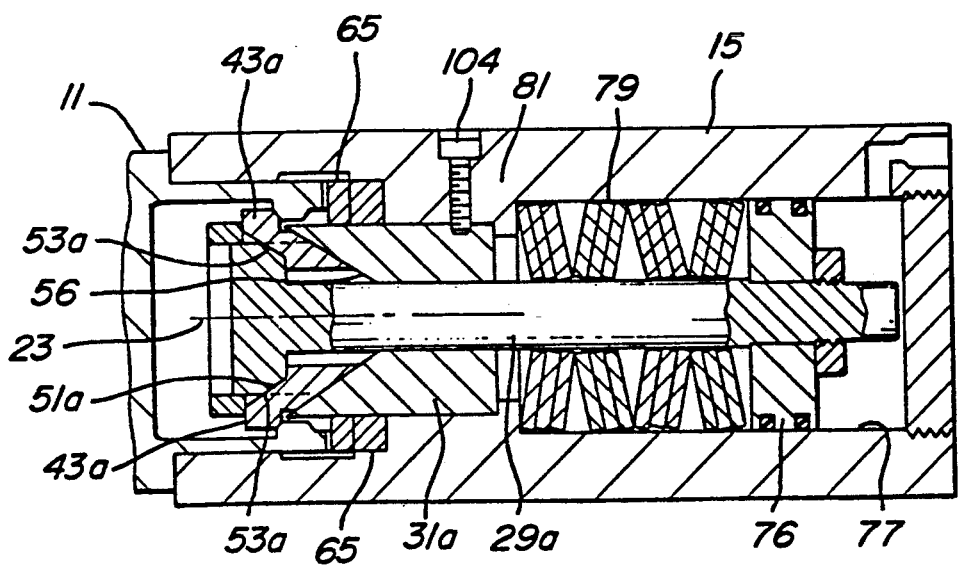
FIG. 6 is a longitudinal sectional view taken through a further embodiment of the invention.

FIG. 6 shows a further embodiment of the invention wherein the drawbar 29a is biased to a wedge locking position by means of coned spring disks (Belville springs); hydraulic pressure is used to move the drawbar to the unlocked position.

In the FIG. 6 embodiment there are six wedge elements 43a arranged in a circumferential pattern within individual radial slots in annular guide member 31a. Member 31a is affixed to housing 15 by a lock pin 104. Each wedge element has the profile cross-section depicted in FIG. 6. An angulated face 51a on each wedge element is in slidable engagement with an angulated flat face 53a on drawbar 29a, whereby rightward motion of the drawbar exerts a cam force on the wedge elements; the wedge elements are thereby moved outwardly to the wedge locking position shown in FIG. 6. Each wedge element extends through an individual radial slot-like guide passageway formed in the annular tubular section of guide member 31a. Angulated flat faces 56 on member 31a limit outward motion of each wedge element Leftward motion of drawbar 29a moves the flat angulated cam surfaces 53a away from the opposed flat surfaces 56 on guide member 31a, thereby permitting the wedge elements to move radially inwardly toward socket axis 23; leftward motion of the tool holder can be used to propel the wedge elements inwardly toward axis 23. Drawbar 29a carries a piston 76 that is slidable in a hydraulic cylinder 77. An array of coned spring disks 79 is arranged between piston 75 and internal wall 81 of housing 15 to normally bias the drawbar to the FIG. 6 position. Introduction of hydraulic fluid into cylinder 77 produces a leftward motion of the drawbar to the unlocked position.

Figure 7:
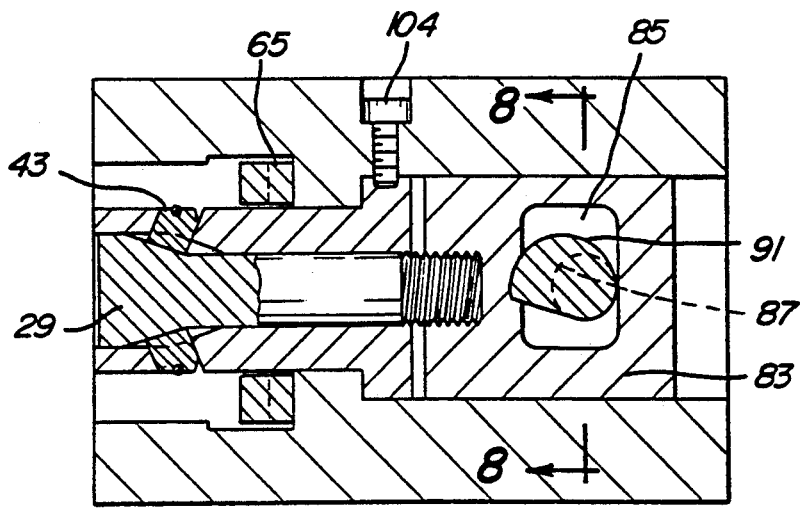
FIG. 7 is a view taken in the same direction as FIG. 6, but illustrating still another form of the invention.
Figure 8:
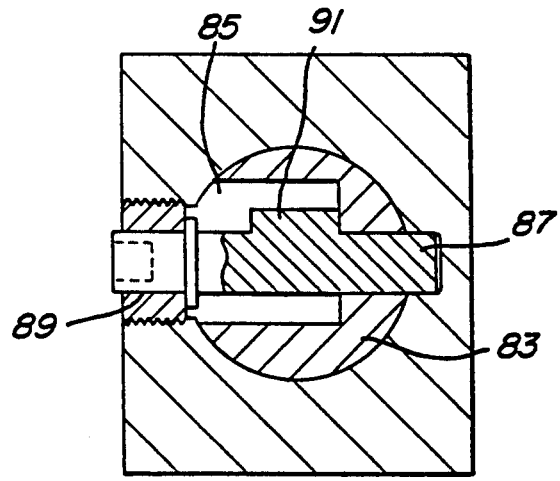
FIG. 8 is a transverse sectional view taken on line 8—8 in FIG. 7.

FIGS. 7 and 8 illustrate a structural arrangement that is similar to the arrangement of FIGS. 1 through 4 in most respects. The difference resides in the drawbar actuator. The actuator comprises a cylindrical cam follower piston 83 attached to the right end of the drawbar. Extending transversely through an opening 85 in the piston is a rotary shaft 87. Opposite ends of the shaft are rotatably supported by housing 15 and by a bearing 89, whereby the shaft can be rotated around its longitudinal axis.

Shaft 87 carries a cam 91 that is in operative engagement with cam surfaces formed by the transverse opening 85 in piston 83. Rotation of shaft 87 through an arcuate distance of about one hundred eighty degrees causes the piston-drawbar assembly to shift between the locking and unlocked positions. The mechanism is shown in the unlocked position, with wedge elements 43 retracted toward socket axis 23. By rotating shaft 87 clockwise through an arc distance of approximately one hundred eighty degrees the piston-drawbar assembly can be shifted rightwardly to the locked position (with wedge elements 43 exerting wedge lock forces on the tool holder flange 57). Cam 91 can be configured to have a slight overcenter movement, such that piston 83 is positively retained in either of its end positions. Rotary motion of shaft 87, manually or with a servo motor, is required to shift the cam follower piston 83 from one position to another.

Figure 9:
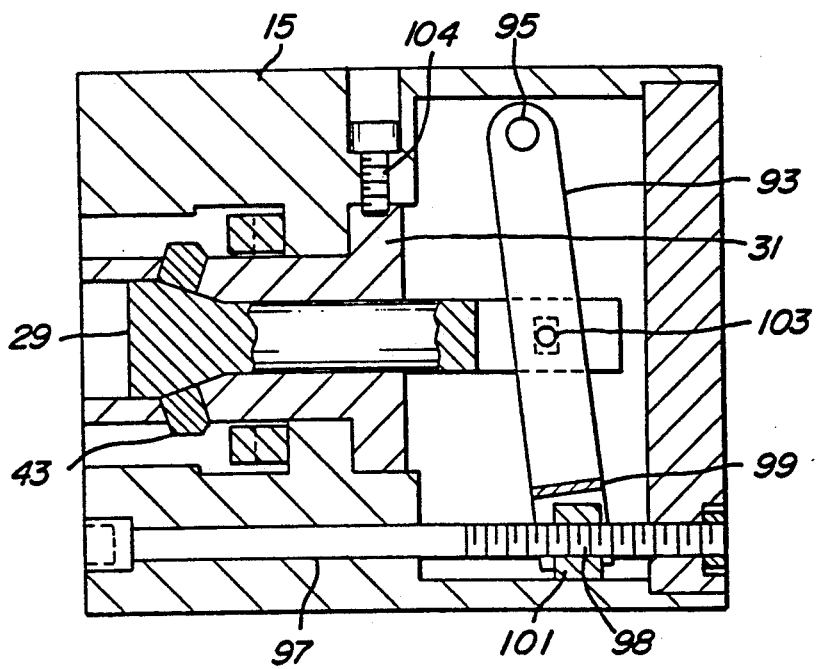
FIG. 9 is a longitudinal sectional view taken through an additional form of the invention.

FIG. 9 shows another type of actuator that can be used to move the drawbar between its two operating positions. A lever 93 is pivotally supported in housing 15 by means of a transverse pin 95. The lever extends through a slotted portion of the drawbar to a point beyond a rotary screw 97 that is rotatably supported in the housing. A bifurcated section 99 of the lever encircles a nut 101 carried on screw 97, whereby rotation of the screw causes the nut to travel along the screw; stub shafts 98 extend from nut 101 into bifurcated section 99 to transmit a swing force to the lever.

The lever has a pin-slot connection 103 with the drawbar for effecting drawbar motion (rightwardly or leftwardly, depending on the direction of rotation of screw 97). The FIG. 9 actuator system is designed for operation by manual or power mechanisms located on the left face of housing 15. The system shown in FIG. 1 is designed for actuation from the right (rear) face of the housing. The systems of FIGS. 5 and 7 are designed for actuation from either side of the housing. The choice of actuator is dependent, to a certain extent, on the overall design of the machine on which the clamping unit is used, i.e. the space available for access or actuation purposes.

The drawings necessarily show specific forms that the invention can take. However, it will be appreciated that the invention can take various forms and configurations not specifically depicted in the drawings

What is claimed is:

1. A mechanism for clamping a cutting tool holder in a machine, said mechanism comprising a clamping unit, a circular socket in the clamping unit; a tool holder having a tubular section adapted for insertion into the socket, and an inturned flange on the terminal end of said tubular section; a drawbar movable linearly within the clamping unit on the socket axis; a multiple number of individual wedge elements surrounding said drawbar for movements toward or away from the socket axis; cam connections between the drawbar and each wedge element for moving the wedge elements outwardly away from the socket in response to axial movement of the drawbar away from the tool holder; an annular drive key member removably mounted within the clamping unit for axial registration with the tubular section of the tool holder; said drive key member having multiple projections thereon for interlocking connection with the tool holder tubular section; and multiple bolts extending through said drive member into the clamping unit to removably fasten the drive key member to the clamping unit, and means enabling the wedge elements to be returned inwardly toward the socket axis in response to movement of the drawbar toward the tool holder; said wedge elements having wedge lock engagement with the tool holder flange when said wedge elements are displaced away from the socket axis by the drawbar.

2. The clamping mechanism of claim 1, wherein said drawbar has a tapered section having flat surfaces thereon in simultaneous cam engagement with said wedge elements; each flat surface having a trapezoidal shape.

3. The clamping mechanism of claim 1, and further comprising an annular drive key member removably mounted within the clamping unit for axial registration with the tubular section of the tool holder; said drive key member having multiple projections thereon for interlocking connection with the tool holder tubular section; said annular drive key member being adjustably mounted in the clamping unit for circumferential adjustment of the multiple projections, whereby the drive member is enabled to accommodate different circumferential orientations of the tool holder.

4. The clamping mechanism of claim 1 wherein said wedge elements have wedge surfaces acutely angled to a radial plane taken normal to the socket axis, whereby said wedge surfaces have mating cam engagements with the inturned flange of the tool holder.

5. The clamping mechanism of claim 1, and further comprising an annular guide member surrounding said drawbar, said guide member having a multiple number of guide passageways extending therethrough; each wedge element being slidably mounted in one of the passageways for guided movement toward or away from the socket axis.

6. The clamping mechanism of claim 5, wherein said annular side member has a loose fit in said clamping unit to allow the guide member to float in compensation for machining tolerances used in clamping unit manufacture.

7. The clamping mechanism of claim 5, wherein said drawbar has a tapered section having flat surfaces thereon in simultaneous slidable engagement with said wedge elements.

8. The clamping mechanism of claim 7, wherein each wedge element has an inner end engaged with the drawbar and an outer end engagable with the tool holder flange; each said inner end having a flat surface mated to an associated flat surface on the drawbar; each said outer end having a conical surface mated to a conical surface on the tool holder flange surface.

9. The clamping mechanism of claim 8, wherein said guide passageways are oriented with their respective axes located in an imaginary conical pattern centered on the socket axis.

10. The clamping mechanism of claim 9, wherein said conical pattern has a cone angle of approximately one hundred forty degrees.

11. The clamping mechanism of claim 5, and further comprising mean for positively returning the wedge elements toward the socket axis; said return means comprising a spring means oriented to bias the individual wedge elements toward the socket axis.

12. The clamping mechanism of claim 11, wherein said spring means comprises an annular resilient band encircling the wedge elements and the annular guide member.

13. The clamp mechanism of claim 12, and further comprising grooves formed in said wedge elements and said guide member to receive the annular resilient band.

14. The clamp mechanism of claim 1 wherein the inturned flange on the tool holder has an internal annular conical surface; each said wedge element comprising outwardly slidable wedge element having an outer conical end face matable with the annular conical surface on the tool holder flange, whereby during outward movements of said wedge elements the conical end faces cam against the conical flange surface to tightly seat the tool holder in the socket.

15. The clamping mechanism of claim 1, and further comprising an actuator means for moving the drawbar linearly along the socket axis within the clamping unit; said actuator means comprising a rotary actuator device axially aligned with the drawbar, and a meshed thread connection between the actuator device and the drawbar, whereby rotation of the actuator device produces linear motion of the drawbar.

16. The clamping mechanism of claim 15, wherein said drawbar has an externally threaded section extending within the rotary actuator device.

17. The clamping mechanism of claim 16, wherein said actuator means further comprises a worm having a gear drive connection to said rotary actuator device; said worm having a rotational axis extending transverse to the rotational axis of the actuator device.

18. The clamping mechanism of claim 1, and further comprising an actuator means for moving the drawbar linearly along the socket axis within the clamping unit; said actuator means comprising a coned spring disk means coaxial with the drawbar for moving the drawbar away from the inserted tool holder, and a fluid cylinder means for moving the drawbar toward the inserted tool holder.

19. The clamping mechanism of claim 1, and further comprising an actuator means for moving the drawbar linearly along the socket axis within the clamping unit; said actuator means comprising a cam follower carried by the drawbar, and a rotary cam mounted within the clamping unit with its rotational axis extending transverse to the drawbar axis.

20. The clamping mechanism of claim 1, and further comprising an actuator means for moving the drawbar linearly along the socket axis within the clamping unit; said actuator means comprising a lever pivotably suspended within the clamping unit for swinging motion around an axis transverse to the drawbar axis, a force-transmitting connection between the lever and the drawbar, and a screw-nut means operatively connected to said lever remote from the lever swing axis, whereby motion of the nut along the screw means produces a swinging motion of the lever and a linear motion of the drawbar.

* * * * *